(No Model.)
C. H. TRUAX.
SURGICAL PUMP.
No. 459,053. Patented Sept. 8, 1891.
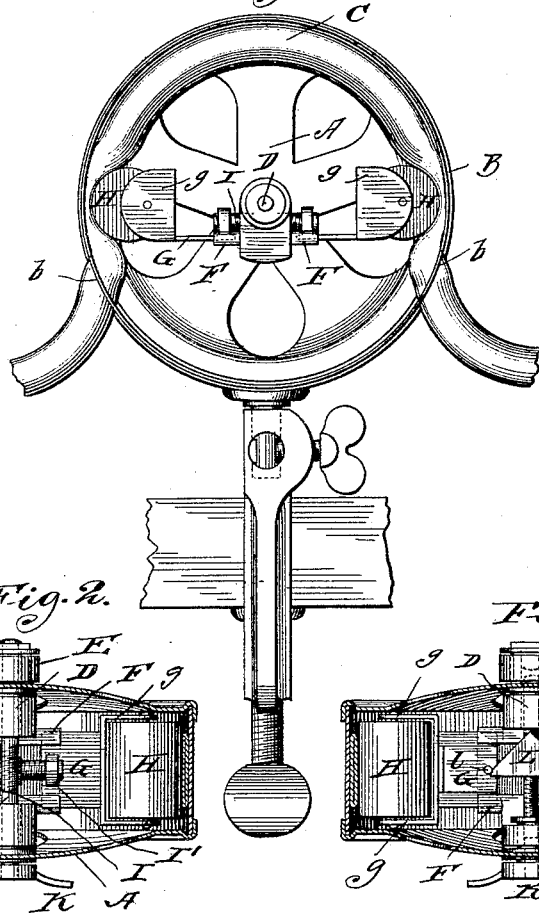
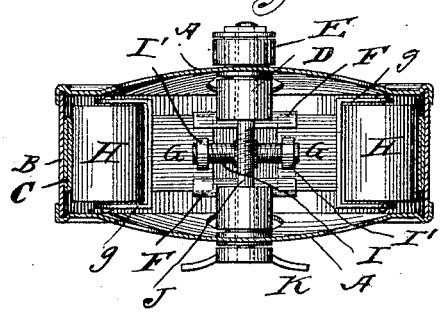
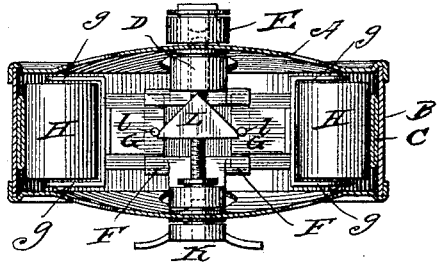
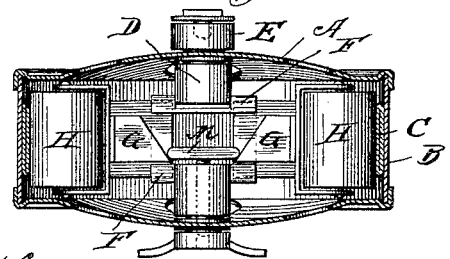
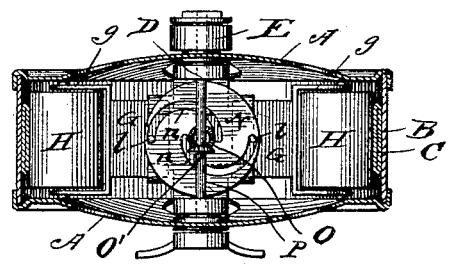
Witnesses,
J. J. Manus
C. W. Martin
Inventor:
Charles H. Truax,
By Offield Towle & Linthicum
Att'ys,

UNITED STATES PATENT OFFICE.

CHARLES H. TRUAX, OF CHICAGO, ILLINOIS.

SURGICAL PUMP.

SPECIFICATION forming part of Letters Patent No. 459,053, dated September 8, 1891.

Application filed March 3, 1891. Serial No. 383,574. (No model.)

*To all whom it may concern:*

Be it known that I, CHARLES H. TRUAX, a citizen of the United States, residing at Chicago, Illinois, have invented certain new and useful Improvements in Surgical Pumps, of which the following is a specification.

My invention relates to that class of surgical pumps having a cylindrical casing apertured at or near its circumference for the passage of the ends of an elastic delivery-tube, against the body of which within the casing a traveling pressure device works in order to cause the movement of a fluid or liquid through the tube.

My invention relates more particularly to a surgical pump of the class wherein the elastic tube passes around only a portion of the perimeter of the casing and wherein a plurality of traveling rollers are employed to engage the tube and cause the movement of the liquid therethrough. The employment of a plurality of rollers is preferred, because thereby a continuous flow of the liquid is secured with a less degree of pulsation than where a single roller is used.

The object of my invention is to provide improved means for radially adjusting the traveling rollers in order to regulate the thrust or pressure thereof upon the delivery-tube and to adapt them to operate with tubes of different sizes. The adjusting means in the preferred construction work positively in the adjustment in either direction and provide at all times a lock to fix the rollers in the adjusted position.

In carrying out my invention I employ a suitable cylindrical casing having a rotating arbor journaled transversely therein, said arbor serving as a support and as a means for moving the traveling rollers in their orbit. These rollers have yokes or stems which have a sliding connection with the arbor interiorly of the casing, and the adjusting means is also located within the casing and is so connected with the rollers as to radially adjust them to and from the spindle positively and yet rapidly. The particular means for moving the rollers laterally to and from the arbor may be somewhat varied without departing from the spirit of my invention, which lies in the central sliding connection of the traveling rollers and the provision of some suitable means located within the casing for positively adjusting them radially to and from the arbor.

In the accompanying drawings I have shown three ways of adjusting the rollers. One means comprises a rod oppositely threaded at its respective ends and having a threaded engagement at said ends with the frames or yokes bearing the rollers and a worm screw or shaft having an end thereof projected outside the casing and adapted to turn the threaded rod, whereby to move the rollers toward and from the arbor. In another construction I employ a wedge having a screw-threaded shank extended also outside the casing, said wedge being adapted to engage the yokes of the rollers and thrust them outward along their ways. In another construction I have shown a disk having cam-slots therein passed over pins connected with the yokes of the rollers and a threaded shaft for rotating said disk. In this construction the rollers are adjusted positively in either direction.

In said drawings, Figure 1 is a side elevation of a pump of the character described, one side of the casing being removed to expose the interior construction. Fig. 2 is a plan view, partly in section, showing the threaded rod and worm-gear adjusting means. Figs. 3 and 4 are similar views showing two forms of construction, wherein a sliding wedge is employed to separate the rollers; and Fig. 5 is a similar view showing the disk having cam-slots therein and the gear for operating it.

In said drawings, A represents the sides of the casing, and B the peripheral wall thereof, which is apertured at *b b* on the same side of a plane passing transversely through the center of the casing.

C is the delivery-tube, having its ends projected through said apertures and a portion of its body within the casing and resting against the peripheral wall thereof.

D is an arbor journaled in the side walls of the casing and having an operating crank or handle E exterior of the casing. Secured with this arbor are guideways F, within which slide the shanks G of yokes, whose arms *g* furnish journals for the rollers H. The turning of the arbor therefore causes the rollers to move in their orbit and compress the tube.

I have shown two of said rollers, but a greater number may be employed; but in all cases they have a sliding connection with the arbor and means located within the casing between the rollers for adjusting them radially. In the form of construction shown in Figs. 1 and 2 these adjusting means comprise a rod I, whose ends are oppositely threaded and engage threaded lugs I', secured with the yoke-arms g. The central portion of the rod I will have a worm-thread cut thereon, and a worm-shaft J, which is extended through the hollow of the arbor D, engages the threads of the rod I. The shaft J has a thumb-piece K applied to the end exterior to the casing. By turning this thumb-piece the threaded rod I is turned and enables the adjustment of the rollers to and from the arbor, so as to vary their thrust upon the tube or to adapt them for use with tubes of different sizes. In the construction shown in Fig. 3 a wedge L is employed, the inclined sides of which engage pins l, secured with the yoke-arms, and in Fig. 4 the ends of the yoke-arms are beveled, and a block M is adapted to be drawn between said beveled ends, thus forcing the rollers outwardly. In Fig. 5 the disk N, having the cam-slots n therein, engaging pins l on the yoke-arm, furnishes means for positively adjusting the rollers to and from the arbor. The disk N carries a bevel-gear O, and the rod P carries a coworking-gear O'. It will be observed that these various constructions are modifications of the same general principle of radially adjusting two rollers which have a central sliding connection, and I do not therefore limit my principal invention to either of said specific forms.

I claim—

In a surgical pump, the combination, with a casing and an elastic delivery-tube located partially within the casing, of an arbor journaled transversely of the casing, a plurality of traveling pressure-rollers each having a sliding connection with the arbor, and adjusting mechanism located within the casing and between the rollers and adapted to be operated from the exterior of the casing, whereby to simultaneously and positively adjust the rollers to and from the arbor, substantially as described.

CHARLES H. TRUAX.

Witnesses:
C. C. LINTHICUM,
FREDERICK C. GOODWIN.